June 9, 1964  J. TUTELIAN  3,136,470
VENTILATED CAGE
Filed Aug. 11, 1961

JOHN TUTELIAN
INVENTOR
HUEBNER & WORREL
ATTORNEYS
BY Richard M. Worrel

United States Patent Office 3,136,470
Patented June 9, 1964

3,136,470
VENTILATED CAGE
John Tutelian, 4025 Raco Ave., Fresno, Calif.
Filed Aug. 11, 1961, Ser. No. 130,825
7 Claims. (Cl. 229—6)

The present invention relates to a ventilated cage and more particularly to such a cage which is readily adaptable to be combined with similar cages to provide an improved assembled handling unit. Said cages provide perforated side walls and substantially open top walls for easier loading with the cages in such handling unit associated in a manner presenting all the side walls of the cages to the atmosphere for improved circulation of ambient air.

Conventional cages of the type employed for transporting large numbers of chicks and the like are customarily constructed of wire netting fastened to a substantially rectangular rigid frame. Such cages usually employ an imperforate bottom member and a hinged top or side wall member providing access into the interior of the cage for loading and unloading purposes. With use, the hingable members are frequently difficult to manipulate and to maintain in a closed position during transport thereof. When cages of this type are stacked together in superimposed relation on or within a truck body or other vehicle the innermost cages within the stack are not permitted sufficient ventilation properly to maintain the ambient air adjacent thereto at the desired optimum temperature. It is known that when large numbers of chicks are so confined, the heat generated by their closely related bodies has a stifling effect which in many cases is sufficiently severe to cause suffocation. Also, such cages occupy the same amount of space when empty as when loaded which makes compact return transport or storage impossible.

It is therefore an object of the present invention to provide an improved ventilated cage and novel assembly thereof.

Another object is to make possible the transport of large numbers of chicks and the like with an absolute minimum suffocation hazard.

Another object of the present invention is to provide a ventilated chick cage adapted to confine the chicks therein without manually operated cage closing devices.

Another object is to provide such a cage which is adapted to separate the chicks in relatively small groups for improved control of the heat generated thereby.

Another object is to provide a chick cage providing individual cages which are readily adapted to be constrained in juxtaposition to other identical cages for assembly in unitary handling units.

Another object is to provide chick cages which may be arranged in such handling units so that the side walls define a plurality of air passages therebetween for complete circulation of air about the cages.

Another object is to provide chick cages which are readily removable from such assembled handling units to liberate chicks therefrom without physically handling the chicks.

Another object is to provide a chick cage having complementary surfaces adapted to nest together for storage and empty transport in a minimum of space.

Another object is to provide a chick cage which is lightweight, durable, easily manufactured, and is safe and convenient to use.

Other objects and advantages of the present invention will become more fully apparent in the subsequent description in the specification.

Figure 1:
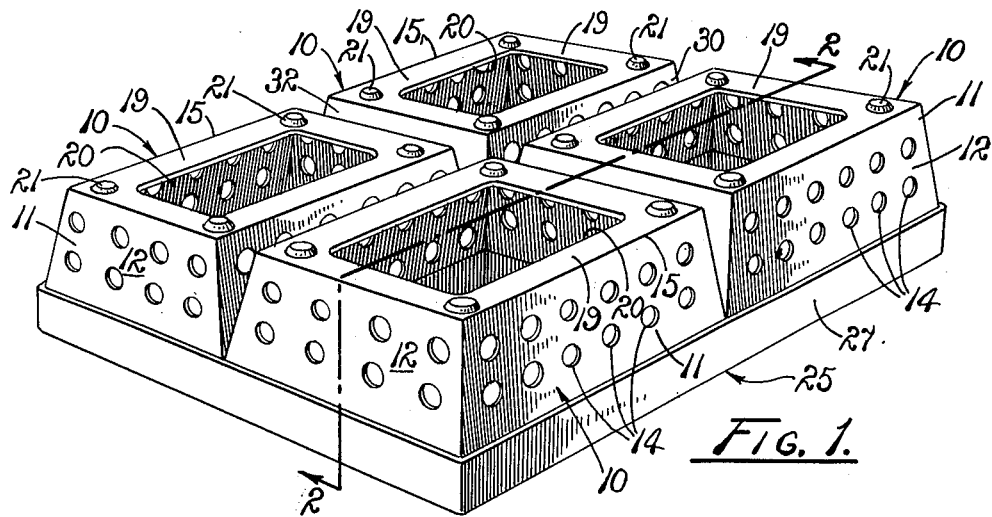
FIG. 1 is a perspective of a plurality of cages of the present invention shown assembled in a handling unit.

Referring more particularly to the drawing, a plurality of cages embodying the principles of the present invention in unitary assembly are individually indicated by the reference numeral 10. As each of the cages are identical in structure, reference is made to a single cage with similar reference characters applied to corresponding elements of the other cages shown associated therewith. As best shown in FIG. 1, each of the cages includes a substantially frusto-pyramidal wall 11 of a suitable fibreboard, plastic, such as polyethylene, or other material having upwardly convergent panels 12 provided with perforations 14 therethrough. Obviously, slots may be substituted for the perforations, if desired. The wall 11 has a substantially rectangular circumscribing upper edge 15 and an opposite lower edge 16. The wall 11 further circumscribes a chamber or cavity 17 therein which communicates with the atmosphere through the perforations 14 in the wall. The panels 12 extend substantially vertically upwardly from the lower edge 16 a predetermined distance to provide a lower substantially erect wall band portion 18. When the cages are cast, as for example of suitable plastic material, the band portions 18 upwardly converge sufficiently to enable them to be drawn from their molds. Obviously the band portions 18 may be continuous with the remainder of their respective panels 12 and lie in planes therewith, if desired. Each panel extends inwardly from the upper edge 15 in a continuous flange or marginal top wall 19 circumscribing an enlarged substantially rectangular upper opening 20 for reasons soon to become apparent. A substantially frusto-conical boss member 21 is provided in the flange 19 adjacent to each of the four corners of the cage in upwardly projecting relation therefrom.

With particular reference to FIG. 1, a plurality of chick cages 10 are adapted to be received in adjacent relation to each other on a conventional tray member 25. The tray is constructed preferably of disposable material such as fibreboard or the like and includes a substantially flat rectangular bottom or floor member 26 which is circumscribed by upwardly extended wall members 27 of a height corresponding to the band portion 18 of the cages. It is apparent that the tray could be provided in various sizes accurately to constrain any desired number of cages 10. In the present embodiment of the invention, the tray is shown as containing four such cages. Such number is found to be excellently suited to the purpose when each cage is dimensioned to receive twenty-five chicks, not shown, for transport. Thus, each unitary assembly of four cages suitably houses one hundred such chicks.

Figure 2:
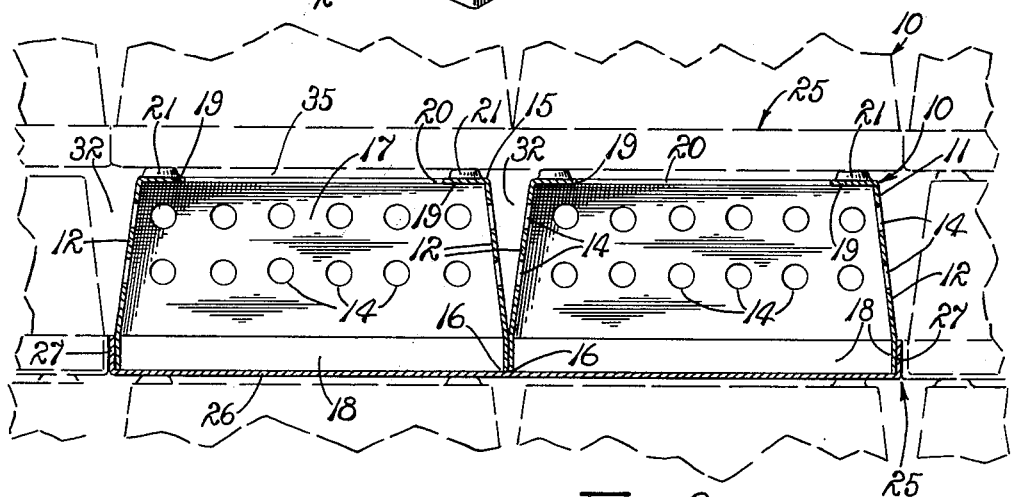
FIG. 2 is a longitudinal vertical section taken on line 2—2 of FIG. 1 showing the handling unit of FIG. 1 sandwiched between identical upper and lower superimposed handling units indicated in broken lines.
Figure 3:
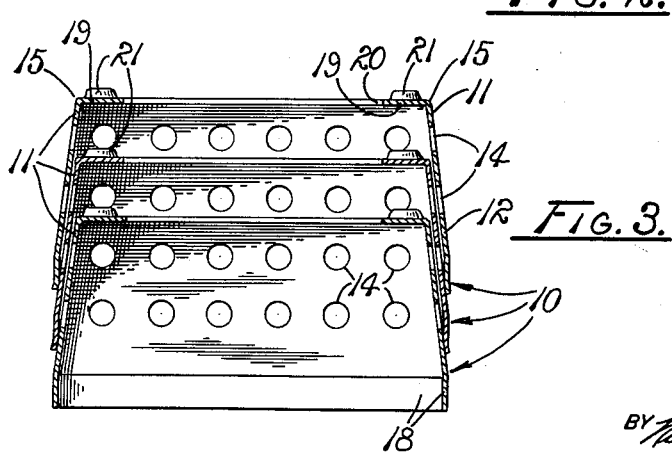
FIG. 3 is a vertical section taken centrally through a plurality of cages removed from the assembled handling units of FIGS. 1 and 2 shown in nesting relation as for compact storage and transport.

With the cage 10 disposed as described upon the tray 25, the pyramidal side walls 11 of the cages thereby define longitudinally extended passages 30 and interconnecting transversely disposed passages 32. As best shown in FIG. 2, when a plurality of such handling assemblies are stacked in superimposed relation, a planar air passage 35 is provided in a plane horizontally disposed between each superimposed bottom tray 25 and the upper flanges 19 of the side walls 11 of the assembly on which such tray is rested. The boss members 21 assure proper spacing for this purpose. From the structure so far described, it is readily apparent that each cage 10 in each handling assembly is provided with three-way ventilation for improved circulation of ambient air around and through the cages.

Operation

The operation of the described embodiment of the subject invention is believed to be clearly apparent and is briefly summarized at this point. When it is desired to transport a large number of chicks or other cargo, an appropriate number of cages 10 and trays 25 are assembled in the handling units of FIG. 1. As discussed, it is preferred that the tray 25 be of a size adequately to hold approximately 100 chicks which are equally divided between the four cages 10. The chicks are loaded in any suitable manner through the upper openings 20 onto the floor 26 of the tray within the walls 11 of the cages 10, by simply depositing the chicks through the openings. It is to be noted that with the frusto-pyramidal side wall construction of the cages the upper openings 20 need not be closed effectively to confine the chicks therein. This feature is readily apparent by reference to FIG. 2 wherein the panels 12 upwardly converge to preclude scaling of the walls by the chicks confined therein. Further, the inturned flanges 19 preclude chick escape even during loading. When all four cages of each assembly have been similarly filled, the tray 25 is readily adapted to be picked up by a fork truck or other mechanism for stacking in vertically superimposed relation on the boss members 21 of other cages. When the stack reaches a predetermined height, the top assembly may be covered if desired to prevent any inadvertent removal or theft of the chicks outwardly of the opening 20. This may conveniently be done by inverting a tray 25 so that the walls 27 thereof extend in depending relation about the cages 10. Such stack of handling assemblies of units can then be quickly and easily loaded onto a truck or other similar transporting vehicle. When such loading is completed, it is readily apparent that the longitudinal passages 30, the transverse passages 32 and the horizontal planar passages 35 are respectively aligned with similar passages in adjacent stacks of the units throughout the load to provide ample ventilation through the perforations 14 for even the innermost cages therein.

When the handling assemblies units reach their destination, the units are unloaded in a manner similar to the previously described loading procedure with the horizontal planar passages 35 having further utility during such loading and unloading operations to receive the forks of a suitable lifting mechanism for individually manipulating the handling units independently of the stack. As each unit is removed therefrom, the cages 10 are lifted from their trays 25 by grasping the upper flanges 19 of the panels 12 to liberate the chicks from the cages. If the chicks are small, they may remain in substantial confinement within the walls 27 of the trays. It is readily apparent therefore that the chicks are liberated from the cages without any direct handling thereof as required by conventional cages for the purpose. The release of all of the chicks in each cage by simply lifting the cage results in much speedier and more economical release than previously accomplished where individual chick handling was required. The frusto-pyramidal side walls of the cages provide further utility in that when removed from the trays the cages accurately conform to each other in nesting relation for compact return transport and storage in a minimum of space. Such return transport permits the carrying of a return payload.

From the foregoing it is readily apparent that the structure of the present invention is effective to constrain chicks for transport with a minimum of physical handling, with sufficient ventilation to preclude or minimize suffocation in even the most tightly packed loads and is readily adapted for nesting with other cages to occupy a minimum of space when transporting empty or during storage. It is also apparent that such structure effectively overcomes the disadvantages of the prior cages provided for the purpose.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A chick handling assembly comprising a substantially flat tray of disposable material, a plurality of plastic cages housing such chicks providing continuous perforated substantially frusto-pyramidal walls of resiliently pliable material, each of said walls having opposite substantially rectangular upper and lower edges circumscribing an individual chamber therein, a flange integral with each of said walls being continuous with and inwardly extended from their respective upper edges to define substantially rectangular restricted openings into the chambers for loading such chicks into the cages, said walls also including a substantially erect band portion adjacent to their lower edges said tray being adapted to support said lower edges of such cages in chick constraining juxtaposition with each other whereby adjacent walls of the cages diverge from their band portions upwardly outwardly of said tray to define passages between the cages so that all of the perforated walls thereof are exposed to the atmosphere, and said cages being removable from said tray automatically to liberate the chicks without physically handling the same and thereafter being nested for storage wherein said band portions minimize sticking and insure ready disassembly of such nested cages.

2. A cage for chicks and the like adapted to be rested on a support surface to confine such chicks and to be nested with similar cages for compact storage and transport, comprising a continuous perforated frustum-shaped wall of sheet material having predetermined open opposite upper and lower ends, the open lower end being substantially larger than the upper end to receive the upper end of a similar cage extended therethrough, a flange integral with said wall continuous with and inwardly extended from the wall at said upper end in circumscribing relation to the opening therein to define a restricted chick loading opening and constituting a barrier to chick escape through said opening, said lower end of the wall being adapted to rest upon such a support surface to close the opening thereof with said cage being removable from the support surface automatically to liberate the chicks without physically handling the same, and means integral with the wall adjacent to the lower end thereof inwardly extended from alignment therewith for engagement with the wall of a similar cage positioned upwardly through the open lower end and to insure ready disengagement of such nested cages.

3. A cage for chicks and the like adapted to be rested on a support member to confine such chicks and to be nested with similar cages for compact storage and transport, comprising a continuous perforated frustum-shaped wall of sheet material having predetermined open opposite upper and lower ends, the open lower end being substantially larger than the upper end to receive the upper end of a similar cage extended therethrough, a flange integral with said wall continuous with and inwardly extended from the wall at said upper end in circumscribing relation to the opening therein to define a restricted chick loading opening and constituting a barrier to chick escape through said opening, said lower end of the wall being adapted to rest upon such a support member to close the opening thereof with said cage being removable from the support member automatically to liberate the chicks without physically handling the same, means integral with the wall adjacent to the lower end thereof inwardly extended from alignment therewith for engagement with the wall of a similar cage positioned upwardly through the open lower end and to insure ready disengagement of such nested cages, and spacer means upwardly extended from the flange being adapted to engage the support member of a similar cage stacked in superimposed relation therewith to provide a horizontally planar passage therebetween for ease of handling, for ventilation therebetween, and effective for blocking said open upper end of the wall.

4. A cage for chicks and the like adapted to be rested on a support member to confine such chicks and to be nested with similar cages for compact storage and transport, comprising a continuous perforated frustum-shaped wall of sheet material having predetermined open opposite upper and lower ends, the open lower end being substantially larger than the upper end to receive the upper end of a similar cage extended therethrough, a flange integral with said wall continuous with and inwardly extended from the wall at said upper end in circumscribing relation to the opening therein to define a restricted chick loading opening and constituting a barrier to chick escape through said opening, said lower end of the wall being adapted to rest upon such a support member to close the opening thereof with said cage being removable from the support member automatically to liberate the chicks without physically handling the same, a continuous band integral with the wall adjacent to the lower end thereof inwardly extended from alignment therewith for engagement with the wall of a similar cage positioned upwardly through the open lower end and to insure ready disengagement of such nested cages, and spacer means upwardly extended from the flange being adapted to engage the support member of a similar cage stacked in superimposed relation therewith to provide a horizontally planar passage therebetween for ease of handling, for ventilation therebetween, and effective for blocking said open upper end of the wall.

5. A cage for chicks and the like adapted to be rested on a support member to confine such chicks and to be nested with similar cages for compact storage and transport, comprising a continuous perforated frustum-shaped wall of sheet material having predetermined open opposite upper and lower ends, the open lower end being substantially larger than the upper end to receive the upper end of a similar cage extended therethrough, a flange integral with said wall continuous with and inwardly extended from the wall at said upper end in circumscribing relation to the opening therein to define a restricted chick loading opening and constituting a barrier to chick escape through said opening, said lower end of the wall being adapted to rest upon such a support member to close the opening thereof with said cage being removable from the support member automatically to liberate the chicks without physically handling the same, a continuous band integral with the wall adjacent to the lower end thereof inwardly extended from alignment therewith for engagement with the wall of a similar cage positioned upwardly through the open lower end and to insure ready disengagement of such nested cages, and a plurality of boss members upwardly extended from the flange being adapted to engage the support member of a similar cage stacked in superimposed relation therewith to provide a horizontally planar passage therebetween for ease of handling, for ventilation therebetween, and effective for blocking said upper open end of the wall.

6. A cage for chicks and the like adapted to be rested on a support member, comprising a continuous perforated frusto-pyramidal wall of sheet material having predetermined open opposite upper and lower ends with the wall circumscribing a chamber, the open lower end being substantially larger than the upper end to receive the upper end of a similar cage extended therethrough for compact storage and transport, a flange integral with said wall continuous with and inwardly extended from the wall at said upper end in circumscribing relation to the opening therein to define a restricted chick loading opening into the chamber and constituting a barrier to chick escape from the chamber through said opening, said lower end of the wall being adapted to rest upon such a support member to close the opening thereof to confine such chicks within the chamber with said cage being removable from the support member automatically to liberate the chicks without physically handling the same, and a substantially upright band integral with the wall adjacent to the lower end thereof for engagement with the wall of a similar cage positioned upwardly through the lower end thereof in said nested relation to minimize adherence therewith and to insure ready disengagement of said nested cages.

7. A cage for chicks and the like adapted to be rested on a support member, comprising a continuous perforated frusto-pyramidal wall of sheet material having predetermined open opposite upper and lower ends with the wall circumscribing a chamber, the open lower end being substantially larger than the upper end to receive the upper end of a similar cage extended therethrough for compact storage and transport, a flange integral with said wall continuous with and inwardly extended from the wall at said upper end in circumscribing relation to the opening therein to define a restricted chick loading opening and constituting a barrier to chick escape from the chamber through said opening, said lower end of the wall being adapted to rest upon such a support member to close the opening thereof to confine such chicks within the chamber with said cage being removable from the support member automatically to liberate the chicks without physically handling the same, a substantially upright continuous band integral with the wall adjacent to the lower end thereof for engagement with the wall of a similar cage positioned upwardly through the lower end thereof in said nested relation to minimize adherence therewith and to insure ready disengagement of said nested cages, and a plurality of boss members upwardly extended from the flange being adapted to engage the support member of a similar cage stacked in superimposed relation therewith to provide a horizontally planar passage therebetween for ease of handling, for ventilation therebetween, and effective for blocking said upper open end of the wall.

References Cited in the file of this patent
UNITED STATES PATENTS

| | | |
|---|---|---|
| 1,826,197 | Adams | Oct. 6, 1931 |
| 2,026,417 | Conway et al. | Dec. 31, 1935 |
| 2,242,741 | Betts et al. | May 20, 1941 |
| 2,738,914 | Hatch | Nov. 20, 1956 |
| 2,771,232 | Reed | Nov. 20, 1956 |
| 2,900,955 | Danielsen | Aug. 25, 1959 |